United States Patent

[11] 3,588,457

[72] Inventors Willem Jan Bijleveld
10, Adriaan Pauustraat;
Adrianus Johannes Van der Toorn, 25,
Norenburg, The Hague, Netherlands

[21] Appl. No. 754,159
[22] Filed June 11, 1968
[45] Patented June 28, 1971
[32] Priority July 15, 1960
[33] Netherlands
[31] 253,879
Continuation of application Ser. No. 498,687, Oct. 20, 1965, now abandoned, which is a continuation-in-part of application Ser. No. 123,477, July 12, 1961.

[54] BEARER WITH LOGICALLY CODED DIGITS
3 Claims, 10 Drawing Figs.

[52] U.S. Cl. .......... 235/61.12, 340/146.3

[51] Int. Cl. .......... G06k 19/06, G06k 9/10

[50] Field of Search .......... 340/146.3, (Cursory); 235/61.12

[56] References Cited

UNITED STATES PATENTS

| | | | |
|---|---|---|---|
| 3,005,106 | 10/1961 | Wilkins | 250/208 |
| 3,105,956 | 10/1963 | Greanias | 340/146.3 |
| 3,114,131 | 12/1963 | Furr et al. | 340/146.3 |
| 3,140,466 | 7/1964 | Greanias | 340/146.3 |
| 3,165,717 | 1/1965 | Eckelman | 340/146.3 |
| 3,185,962 | 5/1965 | Ingham | 340/146.3 |
| 3,257,545 | 5/1966 | Van Berkel | 235/61.12 |

*Primary Examiner*—Daryl W. Cook
*Assistant Examiner*—Robert M. Kilgore
*Attorney*—Hugh A. Kirk

ABSTRACT: An apparatus for reading an information bearer and an information bearer for stylized Arabic digits which are both directly visually and directly binary mechanically readable, incorporating at least one synchronizing element for the mechanical reader and a self-checking feature, and in some styles a self-correcting criterion. Five different styles of digits are disclosed, all of which are made up of congruent larger rectangular areas reserved for each digit. Each of these larger rectangular areas are divided into at least five smaller congruent rectangular areas, in which smaller areas contrasting rectangular elements are located to form the stylized readable digits. General block diagrams of the apparatus for scanning two parallel paths across each style of digit are also shown.

INVENTOR.
W. J. BIJLEVELD
A. J. van der TOORN
BY Hugh A. Kirk
ATTORNEY

INVENTOR.
W. J. BIJLEVELD
A. J. vander TOORN
BY
ATTORNEY

INVENTOR.
W. J. BIJLEVELD
A. J. van der TOORN
BY
Hugh A. Kirk
ATTORNEY

INVENTOR.
W. J. BIJLEVELD
A. J. van der TOORN
BY
Hugh A. Kirk
ATTORNEY

INVENTOR.
W. J. BIJLEVELD
A. J. van der TOORN
BY
ATTORNEY

BEARER WITH LOGICALLY CODED DIGITS

This application is a continuation of U.S. Pat. application Ser. No. 498,687, filed Oct. 20, 1965, now abandoned, which was a continuation-in-part application of applicants' copending U.S. Pat. application Ser. No. 123,477 filed July 12, 1961 which is a Convention application of the original Netherlands Pat. application Ser. No. 253,879, filed July 15, 1960. British Pat. application Ser. No. 25,216 filed July 12, 1961 and French Pat. application Ser. No. 867,686 filed July 11, 1961 are also Convention patent applications of this original Netherlands patent application.

BACKGROUND OF INVENTION

Previously, many different types of digits have been employed which are both visual and machine readable, however, none of the previously known digits have both the logical code and self-checking feature incorporated therein as the present invention. For example, in the British publication "Instrument Practice," published in Mar. 1959, pages 300 and 301, there is shown a set of digits in which each digit is divided into five adjacent congruent rectangular elements forming one large rectangle. Each of the five rectangles is provided with or without a mark for at least 60 percent of its area, and by scanning for each digit five separate binary indications are obtained in a certain order to produce a specific code. However, this five element code is not logical, and a special conversion circuit is necessary to convert the binary bits into a logical binary code. Furthermore, such a device cannot be made self-checking because of the arbitrary locations of the different marked elements so as also to obtain visually readable digits.

In order to make a logical code of digits which were both visually and machine readable, the shape of the digits became very artificial and/or the elements became very small so that very accurate machines had to be used for reading them, which also could cause errors to be made easily by out-of-alignment of the bearer for the digits with the reading machine, and/or by bad printing of the elements of the digits on the bearer. Such types of digits are shown in U.S. Pat. No. 2,000,403 to Maul issued May 7, 1935, in U.S. Pat. No. 2,261,542 to Dickenson et al. issued Nov. 4, 1941. and U.S. Pat. No. 2,942,778 to Brodio issued June 28, 1960.

On the other hand to avoid irregularly shaped visually readable digits as shown in the above mentioned patents, and still produce a logical binary code directly from them, specific printing methods can be employed, such as employing magnetic strips or parts over the printed digits or adjacent them, which magnetic strips or parts are then only readable by the machines such as the digits shown in U.S. Pat. No. 2,784,392 to Chaimowicz issued Mar. 5, 1957 and in U.S. Pat. No. 3,043,506 issued to Bremmer July 10, 1962.

Generally speaking, the information bearer with the markings containing the logically coded digits of this invention comprises a bearer of preferably sheet material or at least having a substantially flat surface upon which the markings can be easily made, which markings comprise visually readable digits "1," "2," "3," "4," "5," "6," "7," "8," "9" and "0," or any combination of one or more thereof. The surface of this bearer upon which these digits are marked or printed, is preferably of a uniform color which has a relatively high degree of contrast with the markings of the digits placed thereon. Each of the digits are marked in separated congruent predetermined larger parallelogram areas, which larger areas each comprise a predetermined plurality adjacent smaller congruent parallelogram areas, corresponding to elements of each digit. These congruent areas are usually rectangular. The larger parallelogram areas are not completely marked or printed, but are imaginary areas and are imaginarily divided into the smaller areas, all of which areas are scanned by the machine for directly reading these digits into their corresponding binary code number.

Thus if at least 60 percent of any one of the smaller parallelogram areas is contrastingly marked with respect to the surface of the bearer, or filled-in with the marking material, it is detectable by the machine as a marked element and counted. Also, since only 60 percent of the area of each element of each digit need be marked, this permits the formation in the larger areas of much more easily visually readable digits.

Each larger parallelogram area contains at least one of the smaller areas or elements for synchronization purposes, such as a start element for initiating the counting of the reading machine, and also each larger area contains at least one smaller area or element for checking purposes, and more than one checking element if the digit is also to be self-correcting. The synchronization element may be part of the visually readable markings forming the digit, or may be adjacent that digit, and more than one may be employed for each digit, such as for synchronizing each one or adjacent pair of elements or smaller areas of each digit. The purpose of the synchronization element or elements is to reduce the errors which may occur due to shrinking and stretching of the surface of the bearer upon which the digits are marked, thereby increasing their readability and decreasing the detection of errors when read by the the machine. This changing and stretching may be due to changes in moisture and/or temperature of the atmosphere in which the bearer is located.

The machine which may be employed for scanning the marked surface of the bearer and directly reading the digits marked thereon, may include one or more, and preferably more, photocells and may even include two groups of photocells in which comparison may be made between groups scanning adjacent or upper and lower portions of each digit for further checking purposes. This photocell scanner is moved uniformly relative to the lighted marked surface of the bearer, and the impulses or bits which are detected by the scanner are directly received in a binary code of the digit scanned. These bits for each digit however may be added and/or counted to determine whether or not the number of contrasting markings are of a predetermined number, such as two or four out of the five or more possible elements, and if not an immediate indication is given that an error has occurred.

This invention also is directed to the particular fonts of type which are employed for producing the configurations of the codes shown in FIGS. 1, 2, 3, 4 and 5, the digits of each font having a predetermined size or area and being divided into congruent parallelogram areas in which certain ones of the parallelogram areas are at least 60 percent marked or unmarked so as to make easily visually readable digits, as well as easily machine readable digits, which digits are also directly readable and self-checking, if not also self-correcting.

Accordingly, it is an object of the present invention to overcome the difficulties of the above mentioned coded information bearers by producing an information bearer having markings thereon which form both easily visually readable digits as well as an easily machine readable binary code which can be directly derived from said visual markings by a scanner and counter.

Another object is to produce a bearer with such markings that are incorporated at least partially if not totally within the visual readable digits themselves and in which no special type of ink or marking material is required so long as said markings contrast with the surface of the bearer upon which they are made.

Another object is to produce such a bearer with markings comprising elements that may be counted in a simple counting circuit connected to the scanning reader therefor, which counting circuit employs simple processes such as addition of whole numbers.

Another object is to produce such a bearer with markings which as elements in each digit which are directly and immediately checkable by the machine reading the markings for each digit, so that the machine will know immediately whether or not it has correctly received any one of the 10 digits which have been scanned.

Furthermore another object of at least one embodiment of this invention is to produce a bearer having markings which have elements therein which enable the machine reading these elements to correct immediately and directly any error which may have occurred in machine reading any of the other elements of that digit.

Still another object of this invention is to produce a bearer with markings thereon of a series of logical machine and visual readable digits, which markings can be accurately read by a machine with greater tolerances than previously employed for the relative location of the information bearer and the markings thereon with respect to the scanning apparatus of the machine, as well as a greater tolerance with respect to the previously required accuracy in which markings of the digits have to be printed or formed on the information bearer.

The above mentioned and other features and objects of this invention and the manner of attaining them will become more apparent and the invention itself will be understood best by reference to the following description of embodiments of the invention taken in conjunction with the accompanying drawings, wherein:

FIG. 1 shows a series of 10 black digits on a contrasting white surface of a bearer incorporating a logical binary code according to one embodiment of this invention;

FIG. 1 *a* is an enlarged view of the digits shown in FIG. 1 together with a rectangular area divided into six smaller congruent areas or elements according to the digital binary code derived from the digits, as well as indicating below each digit the numerical values derived from the bits or elements when scanned by a scanner schematically shown below said rectangular area;

FIG. 2 shows a series of 10 black digits with five synchronization marks located under each digit on a contrasting white surface of a bearer incorporating a logical binary code according to another embodiment of this invention;

FIG. *a* is an enlarged view of the digits and their synchronization marks shown in FIG. 2, together with a rectangular area divided into five smaller congruent areas or elements above the five sync-elements according to the digital binary code derived from said digits and sync-elements, as well as indicating below each digit the numerical values derived from the bits or elements read, which numbers are produced when the visual readable digits and the sync-elements below them are scanned by a scanner connected directly to a counting circuit as schematically shown also below said rectangular areas;

FIG. 3 shows a series of 10 white digits in black rectangles marked on a contrasting white surface of a bearer, incorporating another logical binary code according to still another embodiment of the present invention;

FIG. 3 *a* is an enlarged view of the digits shown in FIG. 3, together with a rectangular area divided into the seven smaller congruent areas or elements according to the digital binary code derived from the digits, as well as indicating below each of the digits the values of the bits when scanned by a scanner directly connected to a counting circuit schematically shown below said rectangular area;

FIG. 4 shows a series of 10 black digits on a contrasting white surface of a bearer incorporating a logical binary code according to still another embodiment of this invention;

FIG. 4*a* is an enlarged view of the digits shown in FIG. 4 together with a rectangular area divided into six elements, two rows of three each, according to the digital binary code derived from the digits, as well as indicating above and below each digit the numerical values derived from the bits or elements when scanned by a scanner, in either the vertical or horizontal, schematically shown below said rectangular area;

FIG. 5 shows a series of 10 black digits and four synchronization elements below each one thereof on a contrasting white surface of a bearer incorporating a logical binary code according to self-correcting code and still a further embodiment of this invention; and FIG. 5*a* is an enlarged view of the digits and synchronization elements shown in FIG. 5, together with a rectangular area divided into seven elements and four black sync-elements below each pair of said seven elements, and below each of the digits the numerical values of the bits or elements when scanned by a scanner and its connected counting and correcting circuits as schematically shown also below said rectangular area.

DESCRIPTION OF THE PREFERRED EMBODIMENTS

I Direct Binary Code

Figure 1:
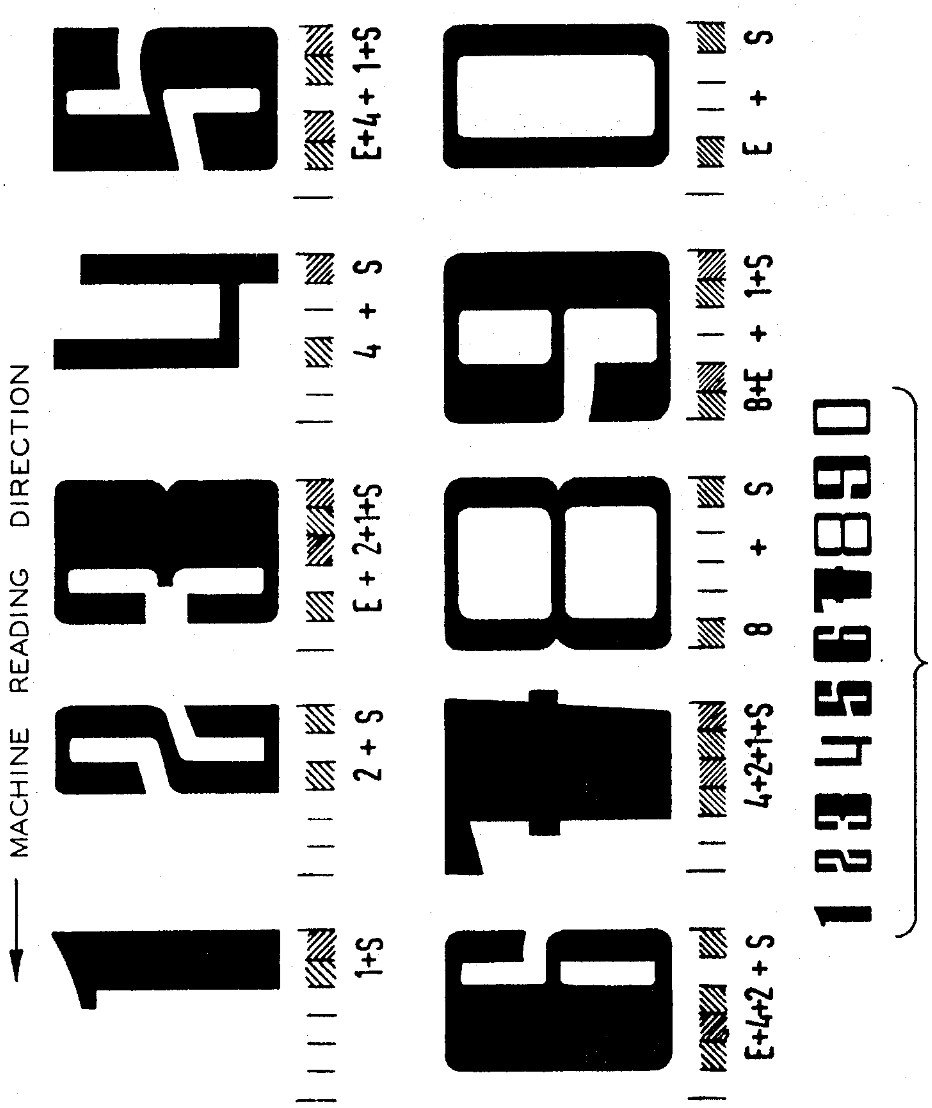
Figure 1A:
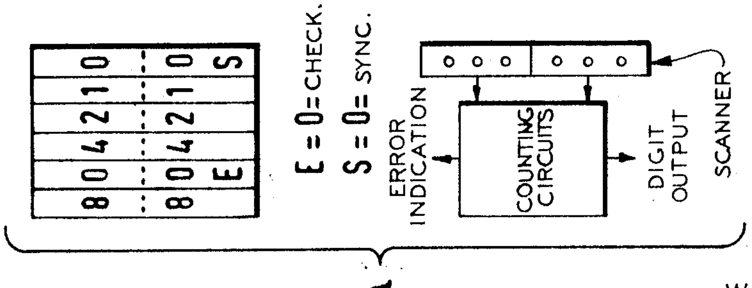

Referring now to the specific embodiment shown in FIGS. 1 and 1*a*, only one or more of the FIGS. or digits shown in FIG. 1 usually appear as markings on the information bearer, which, for example, may be a bank or post-check bearing markings of the number of check, and account number, a money value, a bank number, and/or the like. The information bearer also may be a card, sales slip, invoice, or any other sheet or paper which may be identified by markings of arabic numerical digits.

Fig. 1*a* , however, is an enlarged view of the 10 digits shown in FIG 1 illustrating how they are structurally formed to produce the logical and directly readable binary digital code derived from them. Referring first to the larger parallelogram or rectangular area in the upper left-hand hand corner of FIG. 1*a*, which corresponds in shape to the spaced or separated areas on the bearer allotted for the marking of each digit, which larger area is divided into six congruent smaller parallelograms or adjacent long rectangles arranged side-by-side in the direction that the machine will scan them, as indicated by an arrow at the top of FIG. 1*a*. Below each of the digits are shown vertical dividing lines corresponding to each of these smaller rectangular element areas and shading between these vertical lines for the elements which are more than 60 percent darkened by the visually readable digits. Each of these smaller vertical element areas may be divided into two areas for separate scanning by one or more photocells.

Referring to the schematic block diagram of the scanner in the lower left corner of FIG. 1*a*, there are shown three photocells by little circles for scanning each half-element area for comparison purposes to give more accurate reading. For example, if any two of the three photocells of each group give the same indication, then a bit or mark will be recorded directly for that element.

In this particular embodiment, the first element at the right of each digital area which is read by the scanner or the machine, comprises a synchronization element S and has a numerical value of 0 in both its upper and lower parts. The fifth element from the right of the series of six code elements is the checking element E and also has a numerical value of 0. The other four elements out of the six element or smaller areas are correspondingly given numerical values according to the binary code, namely, 1, 2, 4and 8. Thus, the number "1" which covers the first two element areas has a direct numerical value of (1+S) or (1+0)=1. The number "2" mostly covers the first and third element areas and produces directly an indication of (2+S) or (2 +0)=2. The number "3 " covers the first, second, third and fifth element areas corresponding directly to (E+2+1+S) or (0+2+1+0)=3, since E has a 0 value as does S: etc. The checking element E is used to insure that the number of elements which are detected by the scanner as having marks will always be counted to be an even number, that is either 2 or 4 according to this code. Thus, if the counting circuit shown in the schematic diagram at the lower left of FIG. 1*a*does not count either 2 or 4 elements, bits or marks, that is, if it counts 1, 3, or 5, an indication is immediately given that an error has occurred. Although the digits of this embodiment have different widths, in order also to be directly machine readable, their widths are not so distorted that they are not readily visually readable.

II Code With Sync-Elements

Referring now to the embodiment shown in FIGS. 2 and 2*a*, only those digits or FIGS. with the synchronization elements below them shown in FIG. 2 would occur on the information bearer, In this case the synchronization marks underneath each FIG. are readily ignored when the numbers are visually read, because there sync-elements or marks are the same for each digit. However, they are not ignored by the machine, and they enable the use of fewer elements in the visually readable digits themselves, which must be detected by the machine.

Figures 2, 2A:
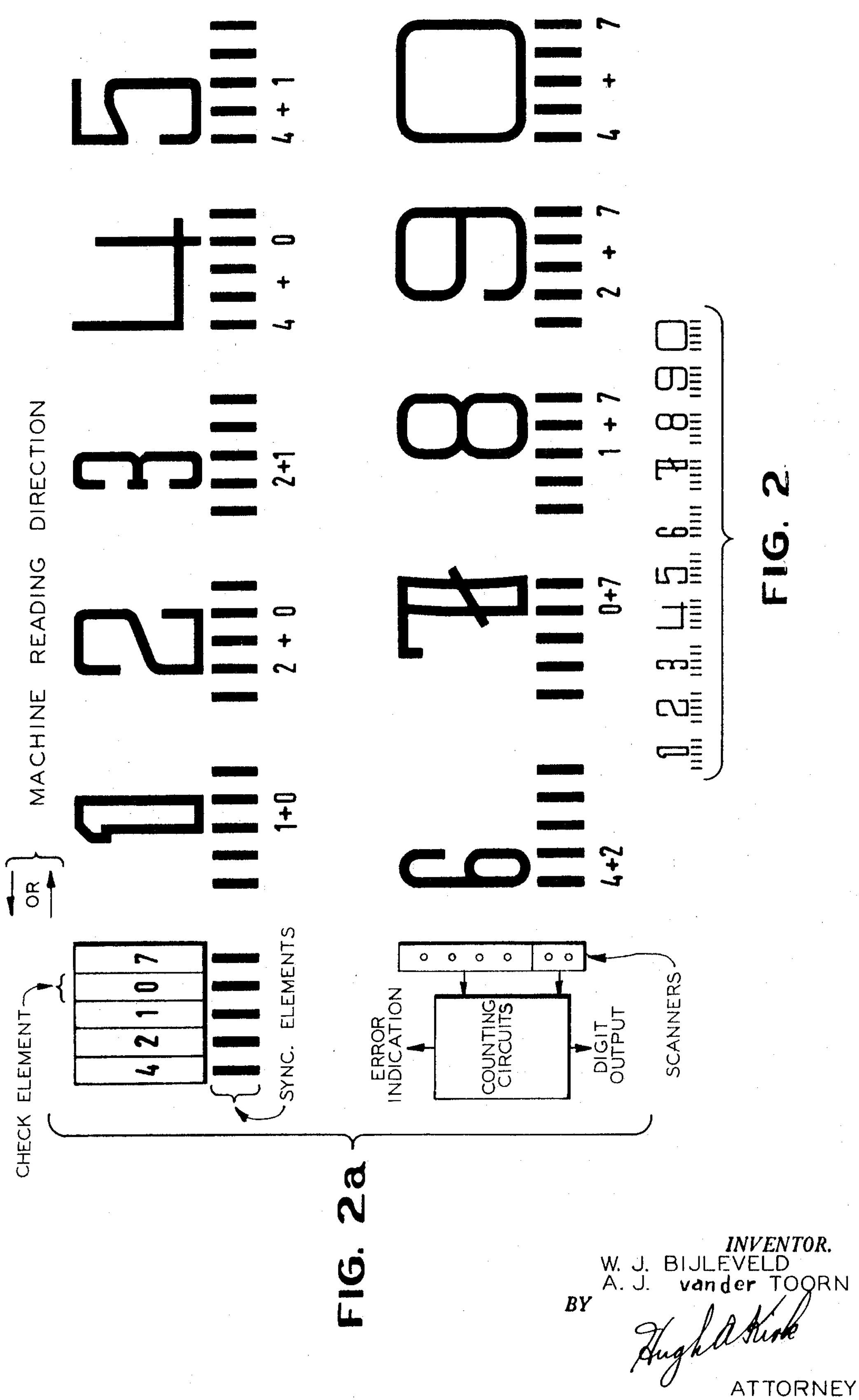

IN FIG. 2*a* the numbers of FIG. 2 are enlarged and shown together with the larger rectangular area above the five sync-elements corresponding to each of the five smaller congruent element rectangles in which the markings are made for each of the digits. Since there are sync-elements below each of the smaller element areas, this code can be read in either horizontal direction. The five smaller element areas have numerical values from right to left of 7, 0 which is used in the checking element, 1, 2, and 4. With this combination of valued elements a binary code of 10 digits can be directly read and added or counted by a machine by using only two and a different two of the five elements for each digit, with the digit "0" corresponding to the elements having numerical values of 4 and 7.

In this embodiment, as in the one in FIG. 1, both the upper and lower portions of each of the visually readable digits are the same, so that they may be scanned by more than one photocell or group of photocells, see the circles in the scanner at the lower left of FIG. 2*a*.

Also, in this embodiment, the thickness of the marks which make up each of the visually readable digits are substantially the same for each of the 10 FIGS. or digits.

III Code In Dark Rectangles

Figure 3:
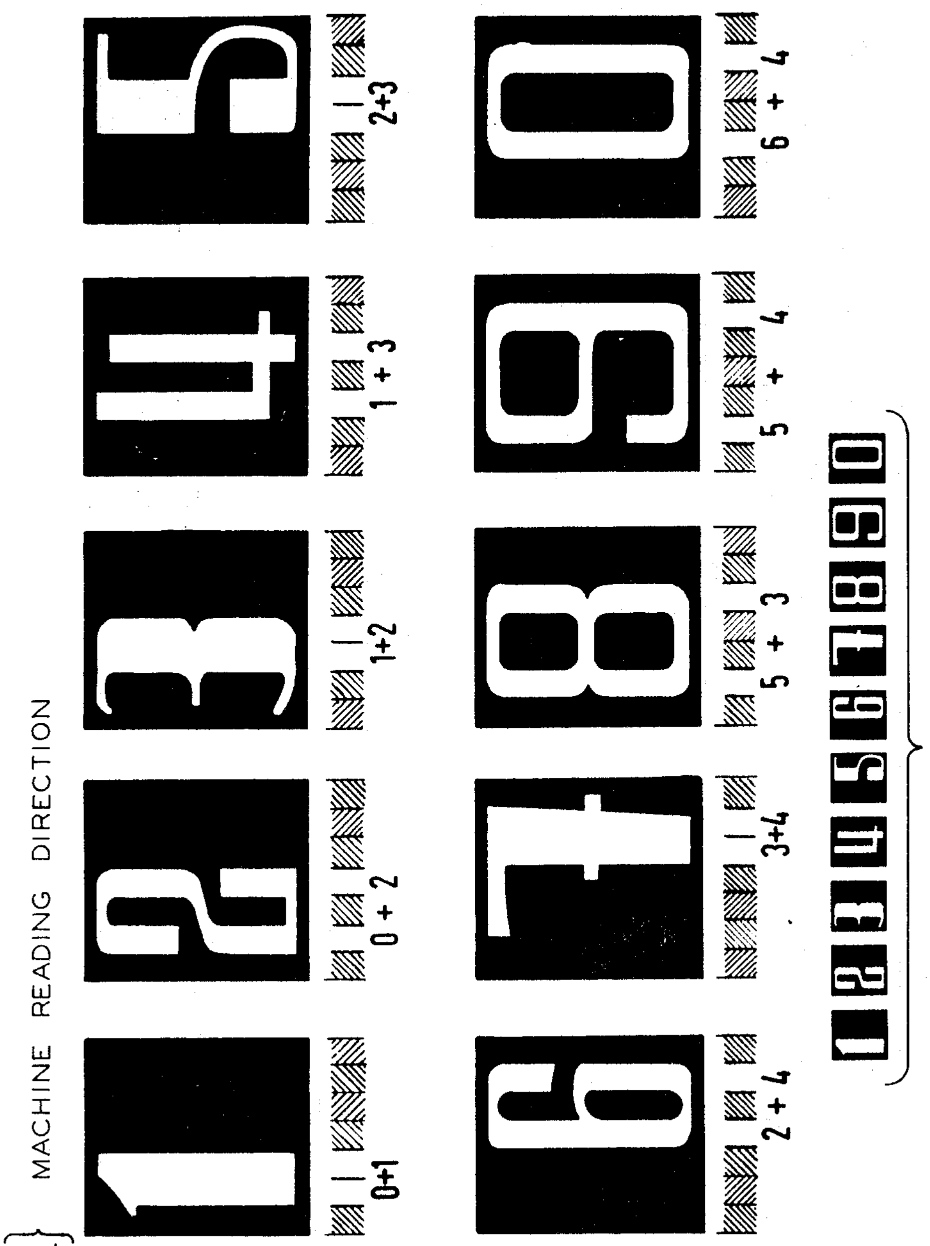
Figure 3A:
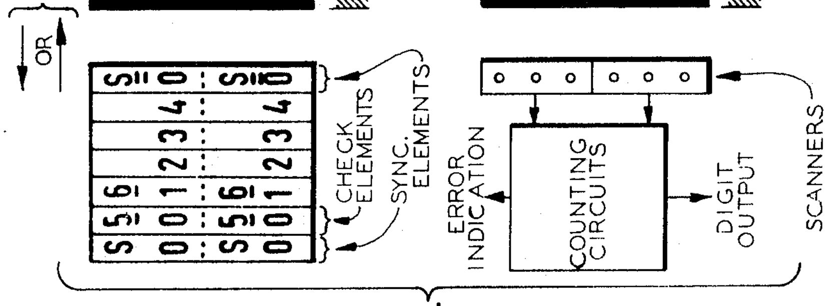

Referring to the embodiment shown in FIGS. 3 and 3*a*, each of the 10 digits are shown as openings in dark rectangles, with the width of each FIG. or digit corresponding to only 60 percent or more of the area open for two out of the seven elements making up each darkened rectangle.

FIG. 3*a* shows these digits enlarged and a rectangle in the upper left corner divided into the seven congruent smaller element rectangles, each of which may be scanned by upper and lower scanners as shown in the schematic diagram in the lower left of FIG. 3*a* and as for the digits of FIGS. 1 and 2, for further checking purposes.

Since each number is in a blackened area, either edge of the area can be detected as a blackened or synchronization element S in the first and seventh element areas, and each of which elements S has a numerical value of 0. The other five intermediate element areas from right to left include: a second element area or checking element having a numerical value of 0 or 5, a third element area having a numerical value of either 1 or 6, a fourth element area having a numerical value of 2, a fifth element area having a numerical value of 3, and a sixth element area having a numerical value of 4.

When these elements are scanned and detected, their numerical values are added, and the checking or second and the third element areas have each of their two different numerical values when detected in combination with different ones of the other elements, that is: the second or checking element is 0 only when it occurs with the third or fourth element, and it is 5 only when it occurs with the fourth and fifth element; and similarly the third element is 1 only when it occurs in combination with the second, fourth and fifth elements and it is 6 only when it occurs in combination with the sixth element. Thus there is no cause for overlap or confusion, and direct connections can be made in the counting circuits for directly adding and counting the elements to indicate the digital output and correctness of the digits read. Furthermore in this particular embodiment, if less than two or more than two contrasting elements are counted in the counting circuit for each digit scanned, an error is indicated.

IV Horizontally and Vertically Readable Code

Figures 4, 4A:
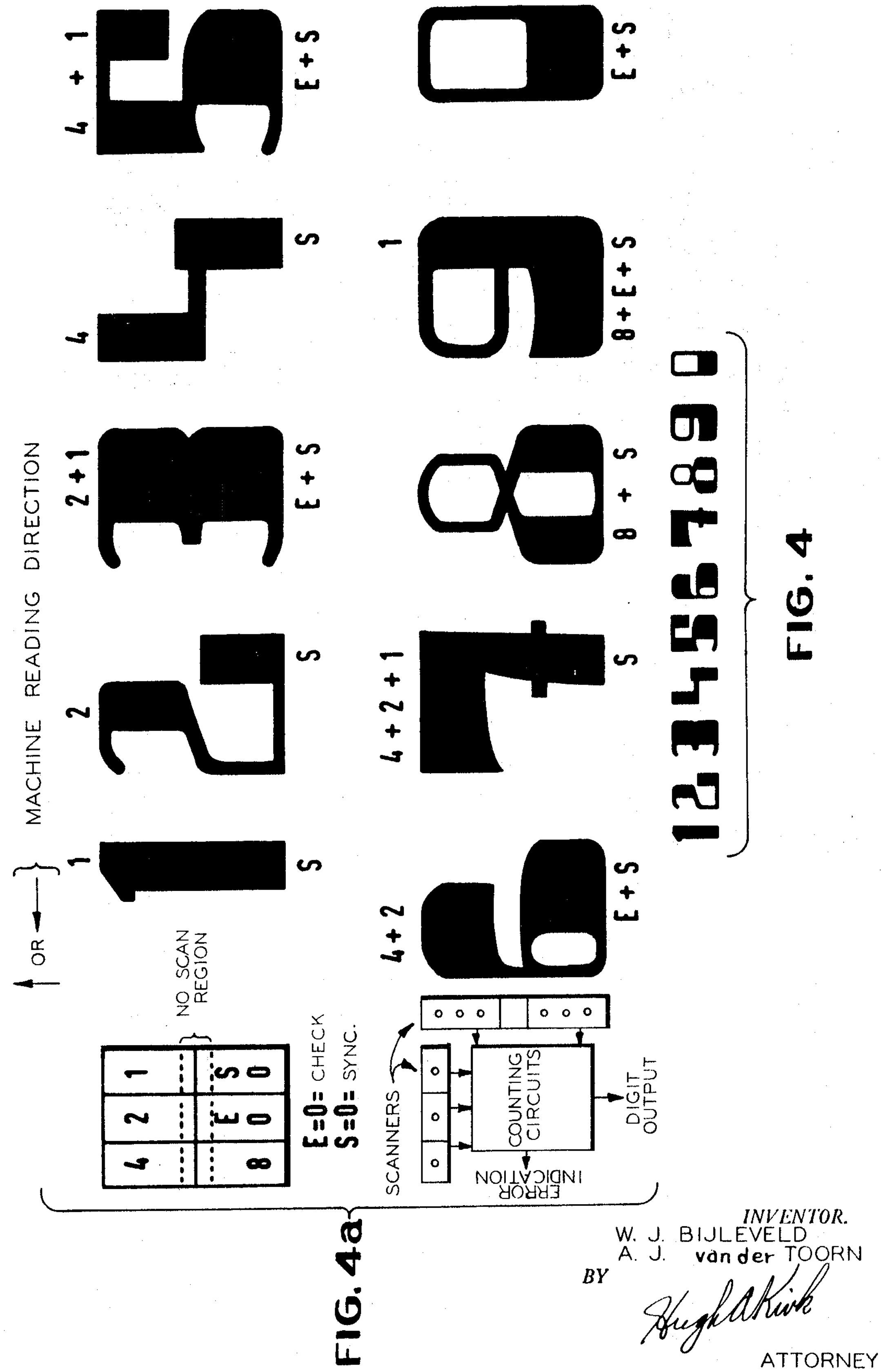

Referring now to another embodiment shown in FIGS. 4 and 4*a*, the digits which appear on the information bearer are one or more of those shown in FIG. 4 only. Each of these digits are composed of elements marked in at least 60 percent of two or more of six smaller congruent rectangular areas of the area larger rectangular area provided for each digit, as shown in the upper left-hand corner of FIG. 4*a*. In this particular instance there are two rows of three element areas, both the upper and lower rows of which must be scanned since they are not the same as in the previous embodiments. There may be a space which is not scanned between these two rows so as to permit additional markings for better visual reading of the digits which "no scan region" or space is set off by dotted lines in said larger rectangle. These digits contain four element areas 1, 2, 4 and 8 corresponding directly to the binary code value for the digit being scanned. The other two element areas comprise the checking element E and the synchronization element S, each of which has a numerical value of 0. Each one of the visual readable digits has a blackened sync-element area S, so that the scanner may detect it first when scanning the digits either vertically from bottom to top, or horizontally from right to left.

The numerical value of the binary code elements directly read by the scanning machine are indicated by the numbers above and below each of the visually readable digits in FIG. 4*a*. In this instance, either two or four elements of the six are read and are counted, and if some other number not two or four is counted such will immediately indicate and error.

V Self-Correcting Code

Referring finally to the specific embodiment shown in FIGS. 5 and 5*a*, in FIG. 5 there are shown the self-correcting digits "1" through "9 " and "0" with four similar synchronization marks below each digit as would appear on the information bearer. The sync-elements or marks are ignored when the digits are visually read because they are the same under each digit.

Figures 5, 5A:
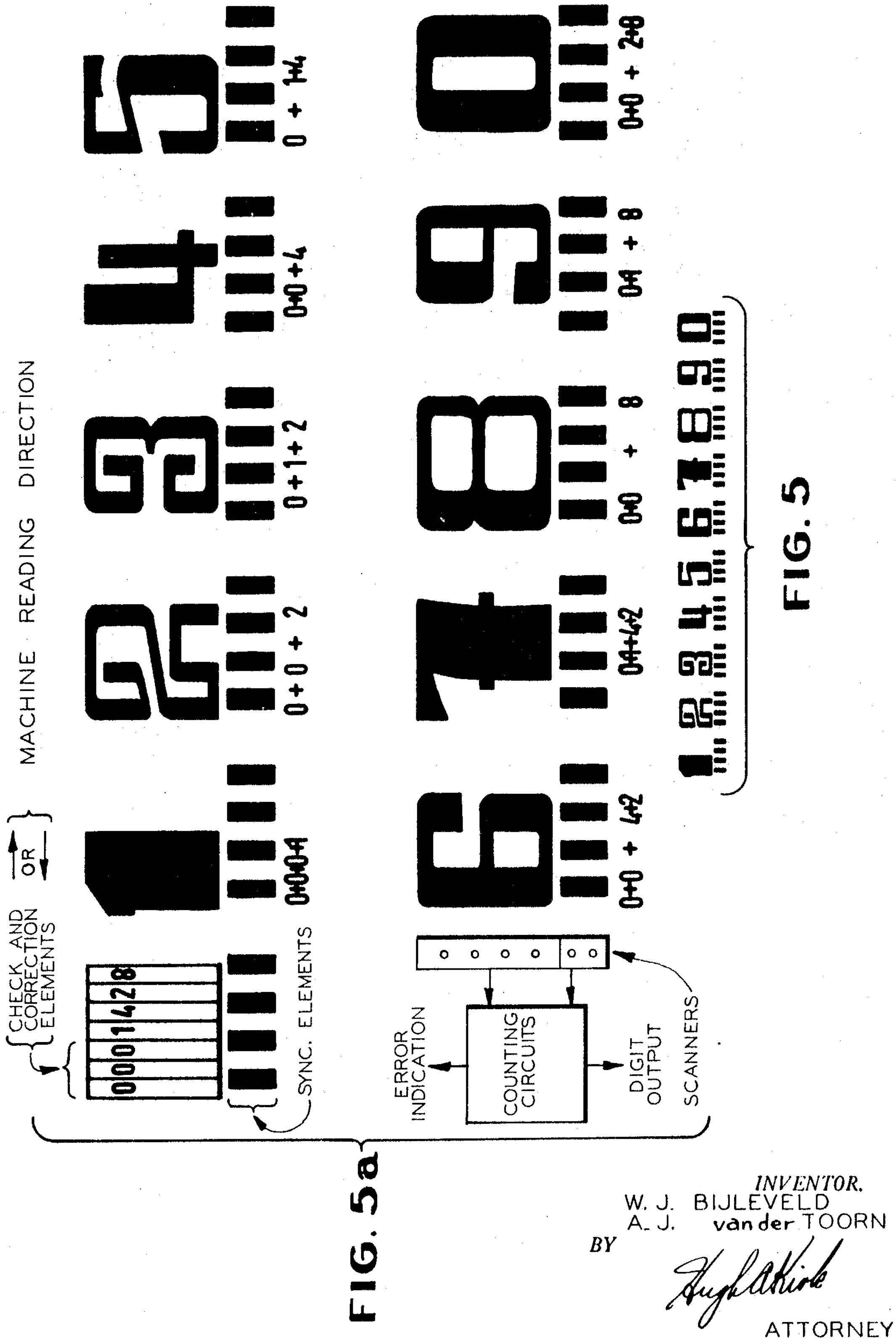

In FIG. 5*a*, there is shown in the upper left-hand corner a rectangle in which the 10 visually readable digits are formed relative to the four synchronization elements, which rectangle is divided into seven smaller adjacent long rectangular elements so that adjacent pairs are above each synchronization element. Furthermore, there are three additionally detectable spaces between each of the sync-elements making seven detectable synchronization elements in all.

Since there are only required four elements for a binary digital code, namely, ones having numerical values of 1, 2, 4 and 8, as shown for the last four of the seven element areas in FIG. 5*a*, the first three element areas are employed as correcting and checking elements, each of which has a numerical value of 0. Since the number of element areas and sync-elements are so numerous, the omission or addition of any element or bit from any digit read by the scanner would not correspond to any other digit, and therefore such an omission or addition is automatically corrected by the counting and correcting circuits schematically shown in the lower left corner of FIG. 5*a*. In other words, there are eight particular combinations of elements which are detected for each digit on the bearer, which elements are counted, and if any one of these is not properly detected by the scanning device, it will automatically be filled in if the other seven of these elements are properly detected for that digit. This permits a much wider variation of reading of the bearer and of errors in it which would be detectable and stop the operation of the scanner of other reading machines.

Furthermore, in this code the number of elements which are read for each digit must be either three or four, for checking purposes.

While there is described above the principles of this invention in connection with specific structure, apparatus and articles of manufacture, it is to be clearly understood that this description is made only by way of example and not as a limitation to the scope of this invention.

I claim:

1. An apparatus for reading Arabic numerals comprising:

a. an information bearer having numerals in the style of characters shown in FIG. 1 marked thereon in a color contrasting with the surface of said bearer, each of which numerals occupies separate equally sized rectangular zones on said bearer, each of which rectangular zones are divided into six equal vertical parallel strip zones, and each numeral comprises marks occupying at least 60 percent of each one of a different combination of an even number of strip zones less than six, and said marks always occupying the first strip zone to the right of each numeral as a synchronizing mark for locating in time the other marked strip zones to the left thereof, and the fifth strip zone from the right of said rectangular zone being a checking zone and reserved for a mark to insure an even number of marks in each rectangular zone;

b. a scanner movable uniformly relative to said bearer from right to left across the numerals marked on said bearer to produce timed impulses from said marks in said strip zones;

c. means connected to said scanner responsive to said timed impulses from said strip zones initiated by the mark in the right-hand strip zone of each numeral to produce directly the multielement binary code signal corresponding to that numeral scanned; and d. checking means connected to said scanner responsive to said impulses from the rectangular zone of each numeral scanned for indicating an error when an odd number of impulses occurs from the rectangular zone of any numeral scanned.

2. An apparatus for reading Arabic numerals comprising:

a. an information bearer having numerals in the style of characters shown in FIG. 3 marked thereon in a color contrasting with the surface of said bearer, each of which numerals occupies separate equally sized rectangular zones on said bearer, each of which rectangular zones are divided into seven equal vertically parallel strip zones, and each numeral comprises marks occupying at least 60 percent of each one of a different combination of five strip zones, said marks always occupying the first and last strip zone at the right and left of each rectangular zone as synchronizing marks for locating in time the two unmarked strip zones relative thereto, and the second strip zone from the left of each rectangular zone being a checking zone and reserved for a mark to insure that two of said strip zones in each rectangular zone are unmarked;

b. a scanner movable uniformly relative to said bearer across the numerals marked on said bearer from one side thereof to the other to produce timed impulses from the marked strip zones, and for indicating and locating the unmarked strip zones thereon;

c. means connected to said scanner responsive to the two unmarked strip zones to produce directly the multielement binary code signal corresponding to that numeral scanned, said means being initiated by the mark in the first strip zone scanned; and d. checking means connected to said scanner responsive to five marked strip zones from the rectangular zone of each numeral scanned for indicating an error when five impulses are not detected from the rectangular zone of any numeral scanned.

3. An apparatus for reading Arabic numerals comprising:

a. an information bearer having numerals in the style of characters shown in FIG. 4 marked thereon in a contrasting color with the surface of said bearer, each of said numerals occupies separate equally sized rectangular zones on said bearer, each of which rectangular zones are divided into six congruent strip zones, three above the horizontal center line of each numeral and three below the horizontal center line of each numeral, and each numeral comprising marks occupying at least 60 percent of each one of a different combination of an even number of strip zones less than six, said marks always occupying the first lower right strip zone for each numeral as a synchronizing mark for locating in time the other marked strip zones, and the center strip zone in the lower three strip zones for each numeral being a checking zone and reserved for a mark to insure an even number of marks in each rectangular zone;

b. a scanner movable uniformly relative to said bearer from right to left simultaneously across both the upper and lower three strip zones of the numerals marked on said bearer to produce timed impulses from said marks in said strip zones;

c. means connected to said scanner responsive to said timed impulses initiated by the mark in the lower right-hand strip zone of each numeral to produce directly the multielement binary code signal corresponding to that numeral scanned; and d. checking means connected to said scanner responsive to impulses from the rectangular zone of each numeral scanned for indicating an error when an odd number of impulses occurs from the rectangular zone of any numeral scanned.